United States Patent [19]

Zama et al.

[11] Patent Number: 4,942,202

[45] Date of Patent: Jul. 17, 1990

[54] RUBBER COMPOSITION AND VULCANIZED RUBBER PRODUCT

[75] Inventors: Yoshiaki Zama; Itsuki Umeda; Yasuhiko Takemura; Masaaki Takashima, all of Tokyo; Yuichi Funabashi, Ohta; Junichiro Watanabe, Ohta; Kiyoshi Takeda, Ohta; Hiromichi Yoshida, Ohta, all of Japan

[73] Assignees: Japan Synthetic Rubber Co., Ltd.; Toshiba Silicon Co., Ltd., both of Tokyo, Japan

[21] Appl. No.: 263,882

[22] Filed: Oct. 28, 1988

[30] Foreign Application Priority Data

Oct. 30, 1987 [JP] Japan .............................. 62-273470
Jul. 29, 1988 [JP] Japan .............................. 63-188327

[51] Int. Cl.$^5$ ............................................. C08F 8/00
[52] U.S. Cl. ................................. 525/104; 525/100; 525/105; 525/106; 525/404; 525/476

[58] Field of Search ............... 525/100, 104, 105, 106, 525/404, 476

[56] References Cited

U.S. PATENT DOCUMENTS 4,369,279  1/1983  Emerick ............................. 525/104
4,544,692 10/1985  Kuziemka ........................... 525/476

*Primary Examiner*—Melvyn L. Marquis
*Attorney, Agent, or Firm*—Oblon, Spivak, McClelland, Maier & Neustadt

[57] ABSTRACT

A rubber composition that is prepared by reacting an organic peroxide, under shear deformation, with 3–70 parts by weight of silicone rubber (I), 30–97 parts by weight of a saturated elastomer (II) that substantially fails to be crosslinked with an organic peroxide when it is used alone, and 0–20 parts by weight of another elastomer (III) that is co-crosslinkable with component (I) in the presence of an organic peroxide and which is also co-crosslinkable or highly miscible with component (II) [where (I)+(II)+(III)=100 parts by weight].

12 Claims, No Drawings

RUBBER COMPOSITION AND VULCANIZED RUBBER PRODUCT

FIELD OF THE INVENTION

The present invention relates to a rubber composition that has good processability on rolls, high mechanical strength and improved heat and cold resistance, as well as improved oil, solvent and gasoline resistance plus improved compression set characteristics and which is prepared by reacting silicone rubber with an organic peroxide in the presence of a saturated elastomer based rubber-forming polymer as they are subjected to shear deformation.

BACKGROUND OF THE INVENTION

Silicone rubber (polyorganosiloxane) is characterized by excellent characteristics including high heat and weather resistance and good mold releasability but it has a serious drawback in that it is inferior in breaking strength, water resistance and gas impermeability as compared to general elastomers, or synthetic rubbers chiefly composed of carbon.

Attempts have, therefore, been made to mix silicone rubber with general elastomers so as to prepare rubber compositions that retain the advantageous features the two components. For example, it has been proposed that the two components be mixed merely by mechanical means as disclosed in JP-A-54-41957 (the term "JP-A" as used herein means an "unexamined published Japanese patent application), JP-A-55-139604 and JP-A-56-76444, or that polyorganosiloxane be bonded to carbon-carbon double bonds (—C=C—) in elastomers as shown in JP-A-54-157149, JP-B-55-15497 (the term "JP-B" as used herein means an "examined published Japanese patent application), JP-A-55-31817, JP-A-56-76440 and JP-A-56-76441.

In practice, however, it is difficult to obtain uniform mixtures by kneading silicone rubber with general elastomers because of the low compatibility of the two components.

Moreover, components that are not crosslinkable by themselves or those which are not co-crosslinkable with one another are not suitable for blending no matter how good rubber characteristics they exhibit. Even if they can be blended by a certain method, the resulting blends are so poor in their physical properties that the features of the two components are not exhibited to the fullest extent.

SUMMARY OF THE INVENTION

Accordingly, an object of the present invention is to provide a rubber composition that is characterized by marked improvement in the miscibility of silicone rubber and an elastomer and which exhibits good processability on rolls, high mechanical strength and improved heat and cold resistance, as well as high resistance to oils, solvents, gasoline, sour gasoline, weather and compression set.

In one aspect, the present invention provides a rubber composition that is prepared by reacting an organic peroxide, under shear deformation, with 3–70 parts by weight of silicone rubber (I), 30–97 parts by weight of a saturated elastomer (II) that substantially fails to be crosslinked with an organic peroxide when it is used alone, and 0–20 parts by weight of another elastomer (III) that is co-crosslinkable with component (I) in the presence of an organic peroxide and which is also co-crosslinkable or highly miscible with component (II) [this third component is hereunder referred to as "another elastomer (III)"] [where (I)+(II)+(III)=100 parts by weight]. The rubber composition prepared in this way is hereunder referred to as simply the "rubber composition".

In another aspect, the present invention provides a vulcanized rubber composition that is prepared from said rubber composition by vulcanizing it in the presence of a crosslinking agent for elastomer (II).

DETAILED DESCRIPTION OF THE INVENTION

Examples of silicone rubber (I) used in the present invention include, but not limited to, homo- and copolymers that contain at least one siloxane unit selected from dimethylsiloxane unit, methylphenylsiloxane unit, methylvinylsiloxane unit, methylfluoroalkylsiloxane unit and methylethylidenenorbornenesiloxane unit.

A preferred example of silicone rubber (I) is a polyorganosiloxane that is represented by the general formula:

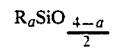

$$R_a SiO_{\frac{4-a}{2}}$$

(where R is a substituted or unsubstituted monovalent hydrocarbon group, with 0.02–10 mol % of R being occupied by a vinyl group; and a is a number of 1.900–2.004) and which has a polymerization degree of 500–10,000.

Silicone rubber (I) for use in the present invention has the general formula set forth above and is predominantly linear. However, part of the silicone rubber (I) may comprise a branched-chain or three-dimensional structure. The silicone rubber (I) maybe a homopolymer, a copolymer or a mixture thereof.

Examples of the substituted or unsubstituted monovalent hydrocarbon group present in the silicone rubber (I) include, but not limited to, methyl, ethyl, propyl, vinyl and phenyl groups, as well as substituted hydrocarbon groups in which the above-listed groups are substituted by a halogen atom or a cyano group. It is necessary that 0.02–10 mol %, preferably 0.05–5 mol %, of the hydrocarbon groups bonded directly to silicon atoms in the molecule be occupied by vinyl groups. If the content of such vinyl groups is less than 0.02 mol %, the reaction with an organic peroxide is insufficient to produce a composition that has desired processability on rolls. In addition, the vulcanized product of the composition will deteriorate in such properties as mechanical strength, heat resistance and cold resistance. If the content of vinyl groups exceeds 10 mol %, the reaction with an organic peroxide will proceed so rapidly that non-uniform kneading results, which adversely affects the physical properties of the rubber composition.

The value of a in the general formula set forth above is in the range of 1.900–2.004, preferably 1.950–2.002. If it is less than 1.900, desired mechanical strength and heat resistance are not attainable. If a exceeds 2.004, polyorganosiloxane having the necessary degree of polymerization cannot be obtained.

The degree of polymerization of silicone rubber (I) is in the range of 500–10,000, preferably 1,000–8,000. If it exceeds 10,000, a desired rubber composition is difficult to synthesize.

The terminals of the molecular chain of silicone rubber (I) may be blocked with a suitable group such as a hydroxyl, alkoxy, trimethylsilyl, dimethylvinylsilyl, methylphenylvinylsilyl or methyldiphenylsilyl group.

The silicone rubber (I) described above is present in an amount of 3-70 parts by weight, preferably 5-60 parts by weight, and more preferably 10-50 parts by weight, per 100 parts by weight of the rubber component consisting of components (I)-(III). If the content of silicone rubber (I) is less than 3 parts by weight per 100 parts by weight of the rubber component, the crosslinking reaction that takes place is insufficient to produce a desired composition even if said rubber component is kneaded with shear deformation being applied in the presence of an organic peroxide. In addition, the resulting composition is low in cold resistance. If the content of silicone rubber (I) exceeds 70 parts by weight per 100 parts by weight of the rubber component, an excessively crosslinked product will results, impairing the processability of the composition or the mechanical strength of the vulcanized product.

Elastomer (II) is a saturated elastomer that substantially fails to be crosslinked even if silicone rubber (I) is crosslinked with an organic peroxide. This elastomer serves as the sea phase of the composition obtained in the present invention. It will not be reduced to a powder even if it alone is subjected to shear deformation under the conditions employed for preparing the composition of the present invention. This elastomer can be made in a sheet form with rolls.

A preferred example of the elastomer (II) is such that it has relatively good physical properties and high resistance to oil, weather and heat.

Specific examples of the elastomer (II) include fluorine rubbers that do not have sites for crosslinking with an organic peroxide, epichlorohydrin rubbers that do not have sites for crosslinking with an organic peroxide, acrylic rubbers that do not have sites for crosslinking with an organic peroxide, and elastomers such as ethylene-α-olefin copolymerized rubbers.

Fluorine rubbers in the category of elastomer (II) maybe composed of combinations of the following fluorine-containing monomers: vinylidene fluoride, hexafluoropropene, pentafluoropropene, trifluoroethylene, trifluorochloroethylene, tetrafluoroethylene, vinyl fluoride, perfluoro(methylvinylether) and perfluoro(propylvinylidene). These monomers are copolymerized with copolymerizable monomers including vinyl compounds such as acrylate esters, olefin compounds such as propylene, and diene compounds. Examples of the fluorine rubbers produced in this way include vinylidene fluoride-hexafluoropropylene copolymer, vinylidene fluoride-hexafluoropropyelene-tetrafluoroethylene terpolymer, tetrafluoroethylene-propylene copolymer, and tetrafluoroethylene-vinylidene fluoride-propylene terpolymer.

Exemplary fluorine rubber include those types which will crosslink with the combination of an organic peroxide and a crosslinking aid but which will not crosslink with a polyol- or amine-based crosslinking agent (e.g. JSR Aflas 150P of Japan Synthetic Rubber Co., Ltd.), and those types which are difficult to crosslink with an organic peroxide but which will crosslink with a polyol- or amine-based crosslinking agent (e.g. Viton A, Viton B and Viton E60 of E. I. Du Pont de Nemours & Co., Ltd., and Technoflon of Montedison S.p.A.).

The above-listed elastomers may be used either on their own or in combination as elastomer (II).

In order to ensure uniform dispersibility with silicone rubber (I) and to permit efficient kneading with it, it is advantageous for elastomer (II) to have a Mooney viscosity ($ML_{1+4}$, 100° C.) of 10-200, preferably 20-150, and more preferably 30-120. By using an elastomer (II) that satisfies this viscosity requirement, rubber compositions having consistent quality and characteristics can be obtained.

The proportion of elastomer (II) in the rubber composition of the present invention ranges from 30 to 97 parts by weight, preferably from 30 to 90 parts by weight, and more preferably from 50 to 90 parts by weight. If the content of elastomer (II) is less than 30 parts by weight, an excessively crosslinked product will result, impairing the processability of the composition or the mechanical strength of the crosslinked product. In addition, the oil and solvent resistance which is inherent characteristic of this elastomer will be appreciably reduced. If the content of elastomer (II) exceeds 97 parts by weight, the crosslinking reaction that takes place is insufficient to produce a desired composition even if the rubber component containing (II) is kneaded with shear deformation being applied in the presence of an organic peroxide.

Another elastomer (III) may be any elastomer that is co-crosslinkable with component (I) in the presence of an organic peroxide and which is also co-crosslinkable or highly miscible with component (II). Commercially available or commonly employed elastomers will suffice. If an ethylene-α-olefin copolymer is used as elastomer (II), an ethylene-α-olefin-diene terpolymerized rubber (e.g. JSR EP 33 of Japan Synthetic Rubber Co., Ltd.) may be used as another elastomer (III). If an epichlorohydrin rubber is used as elastomer (II), an unsaturated group containing epichlorohydrin rubber (e.g. Epikuromer CG of Osaka Soda Co., Ltd.) may be used as another elastomer (III). If a fluorine rubber is used as elastomer (II), a fluorine rubber that is crosslinkable with an organic peroxide (e.g. JSR Aflas 200 of Japan Synthetic Rubber Co., Ltd., Viton GF of E. I. Du Pont de Nemours & Co., Ltd., and Daiel G902 of Daikin Industries, ltd.) may be used as another elastomer (III). If an acrylic rubber is used as elastomer (II), an acrylic rubber that is crosslinkable with an organic peroxide (e.g. JSR AR101 of Japan Synthetic Rubber Co., Ltd.) may be used as another elastomer (III).

There is no particular limitation on the elastomer (II) and another elastomer (III) that can be combined in the present invention but from the viewpoint of maintaining desired quality, it is preferred to select two elastomers whose SP values are close to each other.

In accordance with the present invention, silicone rubber (I), unsaturated elastomer (II) which substantially fails to be crosslinked with an organic peroxide and another elastomer (III) which is optional and co-crosslinkable are mixed under such conditions that only silicone rubber (I) and another elastomer (III) will be substantially crosslinked, and this allows a crosslinkable rubber composition to be produced that is improved in physical properties and processability and which has very high cold resistance.

Illustrative organic peroxides that can be used include: 2,5-dimethyl-2,5-di(t-butylperoxy)hexyne-3, 2,5-dimethyl-2,5-di(t-butylperoxy)hexane, 2,2'-bis(t-butylperoxy)-p-diisopropyl-benzene, dicumyl peroxide, di-t-butyl peroxide, t-butylperoxy benzoate, 1,1-bis(t-butylperoxy)-3,3,5-trimethylcyclo-hexane, 2,4-dichlorobenzoyl peroxide, benzoyl peroxide, p-chlorobenzoyl peroxide, and di-t-butylperoxy isophthalate.

Among these compounds, 2,5-dimethyl-2,5-di(t-butylperoxy)hexyne-3,2,5-dimethyl-2,5-di(t-butylperoxy)hexane, 2,2'-bis(t-butylperoxy)-p-diisopropylbenzene, t-butylperoxy benzoate and di-t-butylperoxyisophthalate are preferred if crosslinking is to be performed at high temperatures. For the purpose of effectively crosslinking silicone rubber (I), benzoyl peroxide, 2,5-dimethyl-2,5-(di-t-butylperoxy)hexane, and 2,2'-bis(t-butylperoxy)-p-diisopropylbenzene are preferred.

These organic peroxides are incorporated in amounts ranging from 0.01 to 10 parts by weight, preferably from 0.05 to 5 parts by weight, per 100 parts by weight of the rubber component consisting of components (I) to (III). If the organic peroxides are used in amounts of less than 0.01 part by weight, the density of crosslinks in the rubber component becomes too low to provide satisfactory mechanical strength, creep resistance and compression set characteristics. If the organic peroxides are used in amounts exceeding 10 parts by weight, the density of crosslinks in the rubber component becomes so high that the resulting composition will not exhibit a desired degree of elongation.

When crosslinking the rubber component, bifunctional vinyl monomers or other crosslinking aids maybe employed. Exemplary crosslinking aids include, but not limited so, the following compounds: ethylene dimethacrylate, 1,3-butylene dimethacrylate, 1,4-butylene dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol triacrylate, divinylbenzene, N,N'-methylenebisacrylamide, p-quinone dioxime, p,p'-dibenzoyl quinone dioxime, triazine dithiol, triallyl cyanurate, triallyl isocyanurate, bismaleimide, and silicone oil with high vinyl content.

These crosslinking aids are preferably incorporated in amounts of from 0.1 to 10 parts by weight, more preferably from 0.5 to 7 parts by weight, per 100 parts by weight of the rubber component.

Two methods are typically used to add an organic peroxide to silicone rubber (I), elastomer (II) and another elastomer (III) which is optional. In one method, components (I) to (III) and an organic peroxide are simultaneously added and kneaded. In the other method, components (I) to (III) are first mixed, and then an organic peroxide is added to the mixture.

Mixing operations can be performed in a variety of extruders, Banbury mixers, kneaders or rolls by kneading the necessary components at a temperature of 50°–250° C., preferably 100°–200° C., for a period of from 2 minutes to 1 hour, preferably from 3 to 45 minutes. A preferred kneading method consists of employing an internal mixer such as a Banbury mixer or a kneader.

Difficulty will be involved in controlling the reaction if the rubber component is crosslinked at a kneading temperature of less than 50° C. If the kneading temperature exceeds 250° C., the rubber might deteriorate.

If the kneading time is shorter than 2 minutes, difficulty will also be involved in controlling the reaction and a uniform composition is difficult to obtain. If the kneading time exceeds 1 hour, the cost of kneading operations becomes unduly high.

If an organic peroxide is to be added, the kneading temperature is generally in the range of 10°–160° C., preferably 20°–100° C., not higher than the temperature at which the half-life period of the organic peroxide used is 1 minute.

As described above, the rubber component must be subjected to crosslinking with an organic peroxide while it is being mixed. During the mixing operation, the shear force is exerted on the elastomers, so the dispersed particles of silicone rubber (I) or another elastomer (III) retain a smaller size and an increased number of molecules are entangled at the interface. If the application of a shear force is discontinued, the dispersed particles of silicone rubber (I) will be associated with either themselves or those of another elastomer (III), causing an increase in particle size and a reduction in the number of entangled molecules.

In this way, silicone rubber (I) and another elastomer (III) are crosslinked as they are mixed in the present invention and this permits the system to be fixed retaining a uniformly dispersed state.

While the rubber composition of the present invention is chiefly composed of components (I) to (III), it may incorporate a variety of additives that are commonly used in the elastomers described above. These additives may be incorporated at the stage of producing the rubber composition of the present invention. If desired, they may be incorporated after the composition has been prepared.

Illustrative additives are reinforcing fillers and extenders which include, but not limited to, fumed silica, wet processed silica, fine quartz powder, diatomaceous earth, carbon black, zinc white, basic magnesium carbonate, activated calcium carbonate, magnesium silicate, aluminum silicate, calcium metasilicate, titanium dioxide, talc, mica powder, aluminum sulfate, calcium sulfate, barium sulfate, asbestos, glass fibers, organic reinforcements, and organic fillers.

Other additives include: dispersing aids (e.g., higher fatty acids and the metal salts or amide salts thereof); plasticizers (e.g. polydimethylsiloxane oil, diphenylsilanediol, trimethylsilanol, phthalic acid derivatives, and adipic acid derivaties); softening agents (e.g. lubricating oils, process oils, coal tar, castor oil and calcium stearate); antioxidants (e.g. phenylenediamines, phosphates, quinolines, cresols, phenols and metal salts of dithiocarbamate); heat stabilizers (e.g. iron oxide, cerium oxide, potassium hydroxide, iron naphthenate and potassium naphthenate); and coloring agents, UV absorbers, flame retardants, oil-resistance improving agents, foaming agents, scorch retarders, tackifiers, lubricants, etc.

To the rubber composition thus prepared, a crosslinking, agent for elastomer (II) such as the combination of an organic peroxide of the type described above and a crosslinking aid, the combination of a polyol crosslinking agent and a polyol crosslinking accelerator, or an amine crosslinking agent is added and kneaded in a standard kneading machine such as rolls or a Banbury mixer, thereby forming a crosslinkable rubber composition, which then is shaped and vulcanized under normal conditions for the production of vulcanized rubbers, so as to yield a vulcanized rubber product.

Illustrative polyol crosslinking agents include polyhydroxy aromatic compounds such as hydroquinone, bisphenol A, bisphenol AF and the salts thereof. Fluorine-containing aliphatic diols can also be used. These polyol crosslinking agents are added in amounts that generally range from about 0.1 to about 20 parts by weight, preferably from about 1 to about 10 part by weight, per 100 parts by weight of the rubber composition.

Preferred examples of the polyol crosslinking accelerator that can be used with polyol crosslinking agents include: quaternary ammonium compounds such as methyltrioctyl ammonium chloride, benzyltriethyl ammonium chloride and tetrahexyl ammonium tetrafluoroborate; quaternary ammonium compounds such as 8-methyl-1,8-diazacyclo(5,4,0)-7-undecenyl chloride; and quaternary phosphonium compounds such as benzyltriphenyl phosphonium chloride, m-trifluoromethylbenzyltrioctyl phosphonium chloride and benzyl trioctyl phosphonium bromide.

These crosslinking accelerators are added generally in amounts of from about 0.2 to about 10 parts by weight per 100 parts by weight of the rubber composition.

Illustrative amine crosslinking agents that can be used include: alkylamines such as hexamethylenediamine, tetraethylenepentamine and triethylenetetramine; aromatic amines such as aniline, pyridine and diaminobenzene; and salts of these amines with aliphatic acids such as carbamic acid and cinnamylidenic acid.

These amine crosslinking agents are added in amounts that generally range from about 0.1 to about 10 parts by weight, preferably from about 0.5 to 5 parts by weight, per 100 parts by weight of the rubber composition.

In order to vulcanize the vulcanizable rubber composition described above, it is subjected to primary vulcanization which is normally effected at 80°–200° C. for a period ranging from several minutes to 3 hours at a pressure of 20–200 kg/cm$^2$. If necessary, secondary vulcanization is performed at 80°–250° C. for 1–48 hours, thereby yielding a vulcanized rubber product.

As described above, the rubber composition of the present invention is amenable to uniform kneading in a kneading machine such as a Banbury mixer, a kneader or two roll mill of the type described above. The kneaded product can be left to stand for a prolonged period of time without experiencing any phase separation, which would otherwise occur if silicone rubber (polyorganosiloxane) were merely kneaded with elastomers. A mere blend of silicone rubber and elastomers (inclusive of a mixture containing a filler or other additives) takes much time to be banded around rolls when adding a crosslinking agent, a crosslinking accelerator, etc. by means of a roll mill. In contrast, the rubber composition of the present invention can be banded instantaneously around rolls, thereby achieving marked improvement in workability on rolls.

The vulcanized rubber product prepared by vulcanizing the vulcanizable rubber composition of the present invention exhibits high mechanical strength and has the feature of improved heat and cold resistance, and hence is applicable not only to the general industry but also to the chemical field.

The following examples are provided for the purpose of further illustrating the present invention but are in no way to be taken as limiting.

In the examples, various properties of the rubber compositions prepared were evaluated or determined according to the following test methods.

1. Roll Processing Properties:
   (a) Banding Time

Two hundred grams of a compounded rubber composition was thrown on 6-inch rolls adjusted to have a surface temperature of 50° C. and to rotate at 20 rpm (front roll) and at 28 rpm (back roll) with a roll nip of 2 mm. The time required for the composition to be completely banded around a roll was measured.

(b) Bleeding of Polyorganosiloxane

A sheet of rubber composition formed in the roll band property test described in (a) was left to stand at room temperature for 16 hours and the surface gloss of the sheet was visually checked for the occurrence of bleeding.

(c) Roll Nip

One hundred grams of a compounded rubber composition was thrown on 6-inch rolls adjusted to have a surface temperature of 50° C. and to rotate at 20 rpm (front roll) and at 28 rpm (back roll) with a nip of 2 mm. The roll nip at which the composition banded completely around a roll was measured.

2. Measurement of Initial Physical Properties, Aging Test, Impact Brittleness Test at Low Temperature, Gehman Torsional Test, and Compression Set Test:

The respective evaluations were made in accordance with JIS K 6301 under the conditions set forth in Tables 1 and 2.

REFERENTIAL EXAMPLE

A hundred parts by weight of a linear polymethylvinylsiloxane having an average polymerization degree of 6,000, in which 0.1 mol % of the organic groups bonded to silicon atoms was occupied by vinyl groups with the remainder being methyl groups and the value of a in the general formula set forth herein was 2.000, was uniformly mixed in a kneader with 35 parts by weight of a fumed silica (Aerosol 200, a product of Nippon Aerosol Co., Ltd.) treated with polyorganosiloxane. In this manner, a silicone rubber composition was prepared.

EXAMPLES 1-3

Silicone rubber (I) which was the silicone rubber composition prepared in the referential example and elastomer (II) which was an acrylic rubber (AR 51 of Nippon Zeon Co., Ltd.) were charged into a BR type Banbury mixer in the proportions shown in Table 1 and masticated at 60 rpm for ca. 1 minute at 70° C. Thereafter, stearic acid and silica or carbon black were charged in the proportions shown in Table 1. The components of the charge were kneaded at 120° C. for ca. 10 minutes until a uniform blend formed.

Thereafter, an organic peroxide (Percadox 14/40 of Kayaku Noury Co., Ltd. containing 40% of 2,2'-bis(5-butylperoxy)-p-diisopropylbenzene as the main component) was charged into the Banbury mixer which was heated with steam at ca. 190° C. for ca. 20 minutes so as to react the uniform blend with the organic peroxide. The resulting rubber composition was discharged from the Banbury mixer.

The discharged rubber composition was subjected to both a roll processing property test and a bleeding test.

Then, the sheet was again banded around a roll in a two-roll mill, and the filler, crosslinking agent and other additives listed in Table 1 were added for further kneading. The kneaded product was subjected to press vulcanization at 100–150 kg/cm$^2$ for 20 minutes at 170° C. Various characteristics of the vulcanized rubber product were evaluated and the results are shown in Table 1.

COMPARATIVE EXAMPLES 1 AND 2

Rubber compositions were prepared as in Examples 1-3 using the silicone rubber composition prepared in the referential example and the acrylic rubber (AR 51 of Nippon Zeon Co., Ltd.) as silicone rubber (I) and elastomer (II), respectively, except that the reaction with an organic peroxide was not performed during kneading operations. Various characteristics of the resulting compositions were evaluated. The proportions of the individual components and the results of evaluations are shown in Table 1.

According to Table 1, the rubber compositions prepared in Comparative Examples 1 and 2 were inferior to those prepared in Examples 1-3 in all aspects including the roll processing properties, initial physical properties (especially tensile strength), physical properties after aging, and brittleness temperature.

EXAMPLE 4

A rubber composition was prepared as in Example 1 except that part of the acrylic rubber used in it was replaced by an acrylic rubber of a diene-based monomer copolymerized type (AR 101 of Japan Synthetic Rubber Co., Ltd.) that was crosslinkable with an organic peroxide. Various characteristics of the resulting composition were evaluated. The proportions of the individual components and the results of evaluation are shown in Table 1.

According to Table 1, the roll processing properties of the rubber composition prepared in Example 4 was comparable to that prepared in Example 1 but the former composition was superior in terms of physical properties, both initial and after aging.

EXAMPLES 5 AND 6 AND COMPARATIVE EXAMPLES 3 AND 4

Rubber compositions were prepared as in Example 1 or Comparative Example 1 except that a fluorine rubber (Aflas 150P of Japan Synthetic Rubber Composition Co., Ltd. or Viton B of E. I. Du Pont de Nemours & Co., Ltd.) was used as elastomer (II). Various characteristics of the resulting compositions were evaluated. The proportions of the individual components and the results of evaluations are shown in Table 1.

According to Table 1, the rubber compositions prepared in Examples 5 and 6 were superior to those prepared in Comparative Examples 3 and 4 in terms of roll processing properties, initial physical properties and brittleness temperature.

EXAMPLE 7 AND COMPARATIVE EXAMPLE 5

Rubber compositions were prepared as in Example 1 or Comparative Example 1 except that an ethylene-propylene rubber (EP 11 of Japan Synthetic Rubber Co., Ltd.) was used as elastomer (II). Various characteristics of the resulting compositions were evaluated. The proportions of the individual components and the results of evaluations are shown in Table 1.

According to Table 1, the rubber composition prepared in Example 7 was superior to that prepared in Comparative Example 5 in terms of roll processing properties and initial physical properties.

EXAMPLE 8

A rubber composition was prepared as in Example 7 except that part of the ethylene-propylene rubber was replaced by a terpolymer rubber containing a nonconjugated diene (EP 33 of Japan Synthetic Rubber Co., ltd.). Various characteristics of the resulting composition were evaluated. The proportions of the individual components and the results of evaluation are shown in Table 1.

According to Table 1, the rubber composition prepared in Example 8 was superior to that prepared in Example 8 in terms of both initial and after-aging physical properties.

EXAMPLE 9 AND COMPARATIVE EXAMPLE 6

Rubber compositions were prepared as in Example 1 and Comparative Example 1 except that silicone rubber (I) was replaced by the linear polymethylvinylsiloxanes listed in Table 1. Various characteristics of the resulting compositions were evaluated. The proportions of the individual components and the results of evaluations are shown in Table 1.

According to Table 1, the rubber compositions prepared in Example 9 was superior to that prepared in Comparative Example 6 in terms of roll processing properties, initial and after-aging physical properties, and brittleness temperature.

EXAMPLE 10

Twenty parts by weight of silicone rubber 1 (dimethylsiloxane-methylvinylsiloxane copolymer; methylvinylsiloxane unit=1.0 mol %; degree of polymerization=6,000) as silicone rubber (I), 70 parts by weight of a fluorine rubber (Technoflon NML of Montefluos S.p.A.) as elastomer (II) and 10 parts by weight of another fluorine rubber (JSR Aflas 200 of Japan Synthetic Rubber Co., Ltd.) as another elastomer (III) were kneaded in an internal mixer (Laboplastomill of Toyo Seiki K.K.) at 60 rpm for 15 minutes and at 80° C. Thereafter, 2.0 parts by weight of Perhexa 25B [the trade name of Nippon Oil & Fats Co., Ltd. for 2,5-dimethyl-2,5-di(t-butylperoxy)hexane] was added and the mixture was further kneaded at 170° C. for 30 minutes. The kneaded product was discharged to obtain sample S-1.

Sample S-1 was mixed with the necessary components to form a rubber compound according to the following recipe.

| Recipe | |
|---|---|
| | (parts by weight) |
| Sample S-1 | 100.0 |
| Carnauba wax | 1.0 |
| Aerosil-130*1 | 20.0 |
| Technoflon M1*2 | 3.0 |
| Technoflon M2*3 | 2.0 |
| Magnesium oxide #150 | 3.0 |
| Calcium hydroxide | 6.0 |

*1 Dry-processed silica of Nippon Aerosil Co., Ltd.
*2 Master batch of bisphenol-based crosslinking agent produced by Montefluos S.p.A.
*3 Master batch of organophosphate produced by Montefluos S.p.A.

The components set forth above were kneaded with 8-inch rolls at 30°–40° C. for 20 minutes. Thereafter, the blend was press-vulcanized at 180° C. for 20 minutes to prepare a vulcanized rubber sheet 2 mm thick. This sheet was post-cured for 4 hours in an air oven at 200° C. The characteristics of the cured product were measured in accordance with JIS K 6301. The results are shown in Table 2.

EXAMPLES 11-16

Rubber compounds and vulcanized rubber sheets were prepared as in Example 10 using the formulations shown in Table 2. Various evaluations were made. In Examples 13-16, fillers were charged simultaneously with the kneading of components (I)-(III). In Examples 10-16, crosslinking aids were charged simultaneously with the feeding of an organic peroxide as crosslinking agent (I).

COMPARATIVE EXAMPLE 7

Twenty parts by weight of silicone rubber 1 as silicone rubber (I), 70 parts by weight of a fluorine rubber (Technoflon NMI of Montefluos S.p.A.) as elastomer (II) and 10 parts by weight of another fluorine rubber (JSR Aflas 200 of Japan Synthetic Rubber Co., Ltd.) as another elastomer (III) were kneaded in an internal mixer (Laboplastomill of Toyo Seiki K.K.) at 60 rpm for 45 minutes at 80° C. The kneaded product was discharged to obtain sample S-2.

Sample S-2 was mixed with the necessary components to form a rubber compound according to the following recipe.

| Recipe | (parts by weight) |
|---|---|
| Sample S-2 | 100.0 |
| Carnauba wax | 1.0 |
| Aerosil-130 | 20.0 |
| Technoflon M1 | 3.0 |
| Technoflon M2 | 2.0 |
| magnesium oxide #150 | 3.0 |
| Calcium hydroxide | 6.0 |
| Perhexa 25B | 2.0 |

Kneading and vulcanizing operations were performed as in Example 1, and so was the evaluation of the characteristics of the cured product. The results are shown in Table 2.

COMPARATIVE EXAMPLES 8-10

Rubber compounds and vulcanized rubber sheets were prepared as in Comparative Example 7 using the formulations shown in Table 2. Various characteristics of the products were evaluated and the results are shown in Table 2.

TABLE 1

| Recipe (parts by weight) | Ex. 1 | 2 | 3 | 4 | 5 | 6 | 7 | 8 | 9 | Comp. Ex. 1 | 2 | 3 | 4 | 5 | 6 |
|---|---|---|---|---|---|---|---|---|---|---|---|---|---|---|---|
| Silicone rubber (I) |  |  |  |  |  |  |  |  |  |  |  |  |  |  |  |
| Silicon rubber composition | 30 | 50 | 30 | 30 | 30 | 30 | 30 | 30 | — | 30 | 50 | 30 | 30 | 30 | — |
| Linear polymethylvinyl-siloxane*1 | — | — | — | — | — | — | — | — | 30 | — | — | — | — | — | 30 |
| Elastomer (II) |  |  |  |  |  |  |  |  |  |  |  |  |  |  |  |
| Acrylic rubber (AR51) | 70 | 50 | 70 | 65 | — | — | — | — | 70 | 70 | 50 | 70 | — | — | 70 |
| Fluorine rubber (Aflas 150P) | — | — | — | — | 70 | — | — | — | — | — | — | — | — | — | — |
| Fluorine rubber (Viton B) | — | — | — | — | — | 70 | — | — | — | — | — | — | 70 | — | — |
| Ethylene-propylene rubber (EP11) | — | — | — | — | — | — | 70 | 65 | — | — | — | — | — | 70 | — |
| Another elastomer (III) |  |  |  |  |  |  |  |  |  |  |  |  |  |  |  |
| Acrylic rubber containing crosslinking sites (AR101) | — | — | — | 5 | — | — | — | 5 | — | — | — | — | — | — | — |
| Ethylene-propylene-diene rubber (EP33) | — | — | — | — | — | — | — | — | — | — | — | — | — | — | — |
| Crosslinking agent (I) |  |  |  |  |  |  |  |  |  |  |  |  |  |  |  |
| Organic peroxide (Percadox 14/40) | 0.5 | 0.5 | 0.5 | 0.5 | 0.5 | 0.5 | 0.5 | 0.5 | 0.5 | — | — | — | — | — | — |
| Crosslinking agent (II) and other compounding chemicals |  |  |  |  |  |  |  |  |  |  |  |  |  |  |  |
| Stearic acid | 1 | 1 | 1 | 1 | 1 | 1 | 1 | 1 | 1 | 1 | 1 | 1 | 1 | 1 | 1 |
| HAF Carbon black | — | — | 50 | — | — | — | 35 | 35 | — | — | — | — | — | 35 | — |
| MT Carbon black | — | — | — | — | 25 | 25 | — | — | — | — | — | 25 | 25 | — | — |
| Silica (Nipusil VN3 of Nippon Silica Industrial Co., Ltd.) | 30 | 30 | — | 30 | — | — | — | — | 30 | 30 | 30 | — | — | — | 30 |
| Process oil (PW-380 of Idemitsu Kosan Co., Ltd.) | — | — | — | — | — | — | 10 | 10 | — | — | — | — | — | 10 | — |
| Crosslinking agent (ammonium benzoate) | 1 | — | 1 | 1 | — | — | — | — | — | 1 | 1 | 1 | 1 | — | 1 |
| Organic peroxide (Percadox 14/40) | — | — | — | — | 3 | — | 2 | 2 | — | — | — | 3 | — | 2 | — |
| Crosslinking aid (triallylisocyanurate) | — | — | — | — | 5 | — | — | — | — | — | — | 5 | — | — | — |
| Crosslinking agent (Diac No. 1 of E.I. Du Pont de Nemours & Co., Ltd.) | — | — | — | — | — | 1.25 | — | — | — | — | — | — | 1.25 | — | — |
| Magnesium oxide | — | — | — | — | — | 15 | — | — | — | — | — | — | 15 | — | 15 |
| Sulfur | — | — | — | — | — | — | 0.3 | 0.3 | — | — | — | — | — | 0.3 | — |
| Results of evaluation |  |  |  |  |  |  |  |  |  |  |  |  |  |  |  |
| Roll processing properties |  |  |  |  |  |  |  |  |  |  |  |  |  |  |  |
| Time to banding (min) | 0.5 | 0.5 | 0.5 | 0.5 | 0.5 | 0.5 | 0.5 | 0.5 | 0.5 | 10 | 10 | 22 | 25 | 5 | 15 |
| Bleeding of silicone rubber | negative | negative | negative | negative | negative | negative | negative | negative | negative | positive | positive | positive | positive | slightly positive | positive |
| Initial physical properties (as press-vulcanized at 170° C. for 20 min, followed by oven-vulcanization at 175° C. for 4 h) |  |  |  |  |  |  |  |  |  |  |  |  |  |  |  |
| Tensile strength (kgf/cm²) | 125 | 101 | 170 | 155 | 105 | 113 | 152 | 166 | 122 | 85 | 64 | 65 | 60 | 122 | 80 |
| Elongation (%) | 350 | 290 | 480 | 350 | 350 | 290 | 390 | 380 | 350 | 330 | 260 | 340 | 300 | 560 | 330 |
| Physical properties aging in Geer oven at 175° C. for 70 h |  |  |  |  |  |  |  |  |  |  |  |  |  |  |  |
| Tensile strength (kgf/cm²) | 103 | 85 | 149 | 120 | 105 | 108 | 110 | 122 | 100 | 62 | 41 | 61 | 55 | 90 | 58 |

TABLE 1-continued

| | Ex. | | | | | | | | | Comp. Ex. | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 |
| Elongation (%) | 300 | 230 | 400 | 290 | 350 | 290 | 320 | 300 | 280 | 100 | 50 | 250 | 240 | 300 | 90 |
| Impact brittleness test at low temperature | | | | | | | | | | | | | | | |
| Brittleness temperature (°C.) | −36 | −50 | −35 | −40 | −45 | −40 | ≦−60 | ≦−60 | −40 | −20 | −42 | −45 | −30 | ≦−60 | −25 |

*1 Linear polyethylvinylsiloxane having an average polymerization degree of 4,500, in which 0.05 mol % of the hydrocarbon groups bonded to silicon atoms was occupied by vinyl groups with the remainder being methyl groups.

TABLE 2

|  | Ex. 10 | Ex. 11 | Ex. 12 | Ex. 13 | Ex. 14 | Ex. 15 | Ex. 16 | Comp. Ex. 7 | Comp. Ex. 8 | Comp. Ex. 9 | Comp. Ex. 10 |
|---|---|---|---|---|---|---|---|---|---|---|---|
| Recipe (parts by weight) | | | | | | | | | | | |
| Silicone rubber (I) | | | | | | | | | | | |
| Silicone rubber 1 | 20 | 10 | — | 30 | — | 40 | 50 | 20 | — | 40 | — |
| EH 41500 (Silicone compound of Japan Synthetic Rubber Co., Ltd.) | — | — | 15 | — | 25 | — | — | — | — | — | — |
| Elastomer (II) | | | | | | | | | | | |
| Technoflon NML (Montefluos S.p.A.) | 70 | — | — | 65 | — | — | 30 | 70 | 100 | — | — |
| Technoflon TH (Montefluos S.p.A.) | — | 85 | — | — | 70 | — | — | — | — | — | 100 |
| Viton B (E.I. Du Pont de Nemours & Co., Ltd.) | — | — | 65 | — | — | 50 | — | — | — | 50 | — |
| Another elastomer (III) | | | | | | | | | | | |
| JSR Aflas 200 (Japan Synthetic Rubber Co., Ltd.) | 10 | — | — | — | — | 10 | 20 | 10 | — | 10 | — |
| Viton GF (E.I. Du Pont de Nemours & Co., Ltd.) | — | 5 | — | 5 | — | — | — | — | — | — | — |
| Daiel G902 (Daikin Industries, Ltd.) | — | — | 20 | — | 5 | — | — | — | — | — | — |
| Crosslinking agent (I) | | | | | | | | | | | |
| Perhexa 25B (Nippon Oil & Fats Co., Ltd.) | 2.0 | — | 2.0 | 3.0 | 3.0 | — | — | 2.0 | — | — | — |
| Percadox 14 (Kayaku Noury Co., Ltd.) | — | 3.0 | — | — | — | 4.0 | 3.0 | — | — | 4.0 | — |
| Triallylisocyanurate | — | — | 3.0 | — | 4.0 | — | 3.0 | — | — | — | — |
| NISSO-PB, B-3000 (1,2-polybutadiene of Nippon Soda Co., Ltd.) | — | — | — | 8.0 | — | 5.0 | — | — | — | 5.0 | — |
| Crosslinking agent (II) and other compounding chemicals | | | | | | | | | | | |
| Technoflon M₁ (Montefluos S.p.A.) | 3.0 | 4.0 | — | 2.5 | 3.0 | — | — | 3.0 | 3.0 | — | 4.0 |
| Technoflon M₂ (Montefluos S.p.A.) | 2.0 | 3.0 | — | 1.5 | 3.0 | — | — | 2.0 | 2.0 | — | 3.0 |
| Diac No. 1 (E.I. Du Pont de Nemours & Co., Ltd.) | — | — | 2 | — | — | 2 | — | — | — | 2 | — |
| Aerosil-130 (dry processed silica of Nippon Aerosil Co., Ltd.) | 20 | — | — | 30 | — | — | 20 | 20 | 20 | — | — |
| Nipsil LP (wet processed silica of Nippon Silica Industrial Co., Ltd.) | — | 15 | — | — | — | 10 | — | — | — | 10 | — |
| MT carbon black | — | — | 20 | — | 15 | 10 | 10 | — | — | 10 | 20 |
| Magnesium oxide #150 | 3 | 3 | — | 3 | 3 | — | 3 | 3 | 3 | — | 3 |
| Magnesium oxide #30 | — | — | 15 | — | — | 15 | — | — | — | 15 | — |
| Calcium hydroxide | 6 | 6 | — | 6 | 6 | — | 6 | 6 | 6 | — | 6 |
| Carnauba wax | 1 | 1 | 1 | 1 | 1 | 1 | 1 | 1 | 1 | 1 | 1 |
| Results of evaluation | | | | | | | | | | | |
| Roll processing properties | | | | | | | | | | | |
| Maximum roll nip (mm) that permitted banding | >2 | >2 | >2 | >2 | >2 | >2 | >2 | 0.5 | >2 | 0.3 | >2 |
| Initial physical properties (as press-vulcanized at 180° C. for 20 min, followed by oven-vulcanization at 200° C. for 4 h) | | | | | | | | | | | |
| tensile strength (kgf/cm$^2$) | 135 | 145 | 120 | 110 | 115 | 110 | 95 | 52 | 160 | 51 | 150 |
| Elongation (%) | 280 | 270 | 250 | 230 | 240 | 260 | 210 | 110 | 250 | 90 | 280 |
| Hardness (JIS-A) | 72 | 76 | 71 | 71 | 69 | 69 | 70 | 73 | 75 | 65 | 78 |
| Physical properties after aging in air by heating at 250° C. for 70 h | | | | | | | | | | | |
| Change in tensile strength (%) | −2 | −1 | −3 | −1 | −2 | −4 | −5 | −10 | −1 | −18 | −1 |
| Change in elongation (%) | −5 | −2 | −4 | −3 | −4 | −8 | −9 | −15 | −3 | −35 | 0 |
| Change in hardness (JIS-A) | +3 | +1 | +2 | +3 | +1 | +5 | +6 | +7 | +2 | +11 | +1 |
| soaking test (in Fuel C at 40° C. for 48 h) Volume change upon swelling, °C.ΔV (%) | +42 | +21 | +35 | +48 | +44 | +61 | +50 | +61 | +9 | +95 | +3 |
| Compression set (200° C. × 70 h) (%) | 24 | 35 | 31 | 26 | 28 | 27 | 35 | 52 | 25 | 70 | 45 |
| TR test TR-10 (°C.) | −25 | −11 | −15 | −28 | −15 | −26 | −32 | −15 | −11 | −14 | −2 |

The rubber composition of the present invention exhibits much better roll processing properties than conventional products. It is free from the problem of bleeding of silicone rubber (polyorganosiloxane) and is highly amenable to subsequent molding and processing. The vulcanized rubber product prepared from this composition also has excellent features as exemplified by not only high mechanical strength but also high cold and heat resistance, as well as high resistance to oils, solvents and gasoline and low compression set characteristics. The rubber composition of the present invention, therefore, solves all of the problems associated with the prior art compositions that are too poor in workability on rolls to be processed satisfactorily or which cannot be blended uniformly on account of their inability to crosslink or co-crosslink. Accordingly, this rubber composition will offer great industrial benefits.

Having the characteristics described above, the rubber composition of the present invention finds utility in the following applications: oil-, chemical-, heat, steam- or weather-resistant packings, O-rings, hoses, other sealants, diaphragms and valves in transportation vehicles such as automobiles, ships and aircraft; oil-, chemical-, heat-, steam- or weather-resistant packings, O-rings, sealants, diaphragms, valves, hoses, rolls, tubes, chemical-resistant coatings and linings in chemical plants; oil , chemical-, heat-, steam- or weather-resistant packings, O-rings, sealants, diaphragms, valves, hoses, rolls and tubes in food processing equipment for plant or home use; oil-, chemical-, heat, steam- or weather-resistant packings, O-rings, sealants, diaphragms, valves, hoses, rolls and tubes in nuclear power plants; and oil-, chemical-, heat-, steam- or weather-resistant industrial parts for general use including packings, O-rings, sealants, diaphragms, valves, hoses, rolls, tubes, linings, mandrels, electric wires, flexible points, belts, rubber sheets, weather strips and roll blades in PPC copiers.

What is claimed is:

1. A rubber composition that is prepared by reacting an organic peroxide, under shear deformation, with
3–70 parts by weight of silicone rubber (I) having the formula:

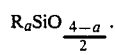

wherein R is a substituted or unsubstituted monovalent hydrocarbon group, with 0.02–10 mol % of R being occupied by a vinyl group, a is a number ranging from 1.900–2.004 with the silicone rubber having a polymerization degree of 500–10,000;
30–97 parts by weight of a saturated elastomer (II) that does not have sites for crosslinking with an organic peroxide, and therefore substantially fails to be crosslinked even if the silicone rubber (I) is crosslinked with the organic peroxide; and
0–20 parts by weight of another elastomer (III) that is co-crosslinkable with component (I) in the presence of an organic peroxide and which is also co-crosslinkable or highly miscible with component (II), the sum of (I)+(II)+(III) being 100 parts by weight of the composition.

2. The rubber composition according to claim 1 wherein elastomer (II) is at least one member selected from the group consisting of a fluorine rubber, an epichlorohydrin rubber, an acrylic rubber, and an ethylene-α-olefin copolymerized rubber.

3. The rubber composition according to claim 1 wherein elastomer (III) is incorporated in an amount of 3–20 parts by weight.

4. The rubber composition according to claim 1, wherein the monovalent hydrocarbon R group of rubber (I) is a member selected from the group consisting of methyl, ethyl, propyl, vinyl, phenyl and these groups substituted by halogen or cyano.

5. The rubber composition according to claim 1, wherein said silicone rubber (I) has a degree of polymerization of 1,000–8,000.

6. The rubber composition according to claim 1, wherein the terminals of the molecular chains of the silicone rubber (I) are blocked with a member selected from the group consisting of hydroxyl, alkoxy, trimethylsilyl, dimethylvinylsilyl, methylphenylvinylsilyl and methyldiphenylsilyl.

7. The rubber composition according to claim 1, wherein said saturated elastomer (II) is a member selected from the group consisting of fluorine rubbers which do not have sites for crosslinking with an organic peroxide, epichlorohydrin rubbers which do not have sites for crosslinking with an organic peroxide, acrylic rubbers which do not have sites for crosslinking with an organic peroxide and ethylene-α-olefin copolymerized rubbers.

8. The rubber composition according to claim 7, wherein said fluorine rubber is prepared from combinations of the fluorine-containing monomers selected from the group consisting of vinylidene fluoride, hexafluoropropene, pentafluoropropene, trifluoroethylene, trifluorochloroethylene, tetrafluoroethylene, vinyl fluoride, perfluoro(methylvinylether) and perfluoro(propylvinylidene).

9. The rubber composition according to claim 8, wherein said fluorine rubber is prepared by copolymerizing one of said fluorine-containing monomers with a vinyl compound or an olefin compound.

10. The rubber composition according to claim 1, wherein the amount of said elastomer (II) in the composition ranges from 30 to 90 parts by weight.

11. The rubber composition according to claim 1, wherein said elastomer (III) is a crosslinkable ethylene-α-olefin-diene terpolymer, a crosslinkable unsaturated group containing epichlorohydrin rubber, a fluorine rubber which is crosslinkable with an organic peroxide or a acrylic rubber which is crosslinkable with an organic peroxide.

12. A vulcanized rubber composition prepared from the rubber composition of claim 1, 2 or 3 by vulcanizing said rubber composition in the presence of a crosslinking agent which is the combination of an organic peroxide and a crosslinking aid, the combination of a polyol crosslinking agent and a polyol crosslinking accelerator or an amine crosslinking agent for elastomer (II).